United States Patent
Pabst

(10) Patent No.: US 7,840,649 B2
(45) Date of Patent: Nov. 23, 2010

(54) METHOD AND DEVICE FOR SETTING UP A VIRTUAL ELECTRONIC TEACHING SYSTEM WITH INDIVIDUAL INTERACTIVE COMMUNICATION

(75) Inventor: Michael J. Pabst, Bad Staffelstein (DE)

(73) Assignee: Nova Informationstechnik GmbH, Lichtenfels (DE)

( * ) Notice: Subject to any disclaimer, the term of this patent is extended or adjusted under 35 U.S.C. 154(b) by 923 days.

(21) Appl. No.: 10/568,973

(22) PCT Filed: Aug. 19, 2004

(86) PCT No.: PCT/EP2004/009303

§ 371 (c)(1),
(2), (4) Date: Feb. 22, 2006

(87) PCT Pub. No.: WO2005/020537

PCT Pub. Date: Mar. 3, 2005

(65) Prior Publication Data

US 2006/0224747 A1 Oct. 5, 2006

(30) Foreign Application Priority Data

Aug. 24, 2003 (DE) .............................. 103 39 436

(51) Int. Cl.
*G06F 15/16* (2006.01)
*G06F 15/167* (2006.01)
*G09B 19/00* (2006.01)

(52) U.S. Cl. ...................... 709/219; 709/206; 709/204; 709/217; 709/213; 434/118

(58) Field of Classification Search ................ 709/219, 709/203, 204, 213, 217; 434/118
See application file for complete search history.

(56) References Cited

U.S. PATENT DOCUMENTS 5,742,759 A * 4/1998 Nessett et al. .................. 726/4

(Continued)

FOREIGN PATENT DOCUMENTS

DE 42 38 848 5/1993

(Continued)

*Primary Examiner*—George C Neurauter, Jr.
*Assistant Examiner*—Kishin G Belani
(74) *Attorney, Agent, or Firm*—Rankin, Hill & Clark, LLP

(57) ABSTRACT

A method and device for setting up a virtual electronic teaching system with individual interactive communication is proposed. Various methods and devices for carrying out tele-teaching or e-learning sessions have been previously suggested. These methods and devices are improved in such a manner that work stations that can be freely interlinked and individual interactive communication can be set up at low cost. Towards this end, a telecommunication network is used that comprises a main distribution frame linked with an exchange (VST). An access multiplexer and/or a splitter are connected to the main distribution frame or are integrated into the main distribution frame. analog or digital telecommunication systems (TE) are connected via an interface circuit (SS). When the connection is set up, at the transmitter end, the kind of connection available to the interface circuit (SS) is determined. A stored test information is transmitted to the remote station and a receipt, received from the remote station in the return direction, is evaluated, wherein the bandwidth available on the telecommunication system (TE) is tested. The system is particularly useful in the field of electronic teaching.

13 Claims, 3 Drawing Sheets

U.S. PATENT DOCUMENTS

| | | | |
|---|---|---|---|
| 5,799,285 A * | 8/1998 | Klingman | 705/26 |
| 5,995,239 A | 11/1999 | Kagawa | |
| 6,115,755 A | 9/2000 | Krishan | |
| 6,356,943 B2 * | 3/2002 | Murray et al. | 709/220 |
| 6,434,612 B1 * | 8/2002 | Hughes et al. | 709/223 |
| 6,680,970 B1 | 1/2004 | Mejia | |
| 6,826,196 B1 * | 11/2004 | Lawrence | 370/466 |
| 7,313,130 B2 * | 12/2007 | Redfern | 370/352 |
| 2002/0059408 A1 * | 5/2002 | Pattabhiraman et al. | 709/223 |
| 2003/0169780 A1 * | 9/2003 | Kukic | 370/535 |
| 2003/0225889 A1 * | 12/2003 | Moutafov | 709/227 |
| 2004/0073596 A1 * | 4/2004 | Kloninger et al. | 709/200 |
| 2005/0027954 A1 * | 2/2005 | Rothman et al. | 711/159 |
| 2007/0136480 A1 * | 6/2007 | Stephenson et al. | 709/227 |
| 2008/0235427 A1 * | 9/2008 | Okamoto et al. | 710/301 |

FOREIGN PATENT DOCUMENTS

| | | |
|---|---|---|
| DE | 198 20 688 | 11/1999 |
| DE | 296 23 893 | 6/2000 |
| DE | 199 59 179 | 6/2001 |
| EP | 0 689 327 | 12/1995 |
| EP | 1 035 722 | 9/2000 |
| WO | WO 01/35240 | 5/2001 |
| WO | WO 02/03744 | 1/2002 |
| WO | WO 02/37697 | 5/2002 |
| WO | WO 02/75694 | 9/2002 |
| WO | WO 02/097654 | 12/2002 |
| WO | WO 03/026248 | 3/2003 |
| WO | WO 03/046861 | 6/2003 |

* cited by examiner

METHOD AND DEVICE FOR SETTING UP A VIRTUAL ELECTRONIC TEACHING SYSTEM WITH INDIVIDUAL INTERACTIVE COMMUNICATION

This application is the national stage of PCT/EP2004/009303 filed on Aug. 19, 2004 and claims Paris Convention priority of DE 103 39 436.2 filed Aug. 24, 2003.

BACKGROUND OF THE INVENTION

The present invention primarily concerns a method for setting up a virtual electronic teaching system with individual interactive communication. Furthermore, the present invention concerns device for setting up a virtual electronic teaching system for implementation of the method.

The areas of e-learning, tele-teaching and remote-training, as well as areas of internal training and further education, training of service units, etc., are generally defined by the fact that users from very different educational backgrounds and with varying technical equipment (computers and periphery) come together for a defined time in defined teaching events.

The majority of connections to the Internet or to other data services is established by means of modems via telephone cable, i.e. a double copper conductor (so-called a/b pair or subscriber line), which originally was intended for the purpose of voice transmissions from about 300 Hz to 3400 Hz (POTS). In order to guarantee the highest level of transmission security, the existing analog transmission technology is replaced to an increasing extent by digital transmission technology. For this purpose, systems working according to the standard of "Integrated Services Digital Network" (ISDN) are predominantly being used in wire communication technology.

With the aid of a frequency separating filter, for example, a splitter matrix, voice and data are separated, as a rule, by means of passive low-pass and high-pass filters and fed into the telephone wire (for example, for a DSL transmission process). The voice communications are transmitted to a classic exchange, which is referred to as a so-called PSTN (Public Switched Telephone Network), and the data are transmitted, after the splitter, to a DSLAM (Digital Subscriber Line Access Multiplexer—a device that converts the signals from several DSL lines into a broadband channel). Therefore, it is not possible to draw a distinct separating line between conventional telecommunication networks and computer data networks here. DSL modems, being the most important element for a DSL connection, are connected to both ends of the connection line.

In the DSLAM, for example, it is possible to utilize the ADSL technology (Asymmetric Digital Subscriber Line, an asymmetric DSL data transmission method). This is to be understood as a transmission technology that allows, at a high bandwidth, Plain Old Telephone Services (POTS) or ISDN for voice transmission, as well as asymmetric multimedia services without regenerators on the same pair of wires without disturbances. It must be asymmetric (ADSL), because in the direction from the user to the network (upstream), the transmission is relatively low-rate (for example, at approx. 800 KBit/s), and in the direction from the network to the user (downstream) it is relatively hi-rate (for example, up to approx. 8 MBit/s). Aside from the ADSL technology, other DSL technologies are in common use, as well, for example, HDSL=High Transfer rate Digital Subscriber Line, SDSL=Single Line Digital Subscriber Line, MDSL=Multirate Digital Subscriber Line, RADSL=Low Rate Adaptive Digital Subscriber Line and VDSL=Very High Rate Digital Subscriber Line, each of which is optimized for their respective applications and which are grouped under the generic term xDSL transmission technology.

Another possibility being able to transmit continual data flow at low costs, for example, voice or video communications, are offered by packet-switched communication networks, such as LANs (Local Area Networks), MANs (Metropolitan Area Networks) or WANs (Wide Area Networks). For example, the so-called Internet telephoning is based on this technology, which is frequently also referred to as "Voice over Internet Protocol" (VoIP). The parallel operation of an audio network with a PC network in a teaching system is described, for example, in DE 42 38 848 C2. The PC network is intended for visual data transmission and is wired independently from the audio network consisting of single-board computers as well as D/A converters and A/D converters for audio transmission. A control computer installed in the central control module of the teacher controls the PC network as well as the audio network with one control program [=control software] with a common user interface for the PC network and the audio network for the coordination of the simultaneous operation of both networks. Therefore, the central control module serves the purpose of controlling a PC network as well as the audio network. The control software also includes monitoring functions. For instance, a visual display of the current operating condition of the single-board computer, the student's workstation or the student's computer on the monitor of the control computer is possible. In addition, the current progress status of work instructions or assignment texts of individual students can also be verified on the monitor of the control computer. A visual display of current operating conditions of individual components of the control module is possible, as well. The control software also handles voice connections between teacher and student. All events occurring during a lesson can be recorded and, in form of an instruction record, can either be saved automatically on the hard disk of the central control computer or printed out. Due to the uniform user interface for the PC network and the audio network, the classroom sheet is always identical in both networks.

Thus, due to the described non-homogeneity, communications take place via connections with a wide variety of bandwidths, i.e., for example, 56 KBit analogue connections or 64 KBit ISDN or DSL or—insofar as integrated in a LAN—via 100 MBit twisted pair lines, or via dial-up connections 2 MBit and better, or via dedicated lines X.25. Correspondingly, there are a multitude of known interface devices, for example:

ISDN $S_0$-interfaces,
LAN-interface FE (with program memory) to PCI bus,
external LAN-interface LAN (with program memory) as 10/100 Mbit/s Ethernet or token ring,
WAN-interfaces WAN: X.21, V.35, G.703/704 to 2 Mbit/s.

As far as, on the one hand, contents are available on a content server, which can be accessed via the Internet, and as far as, on the other hand, communications in form of video conferencing also take place via the Internet, various different protocols must be observed in this respect. For these protocols, based on the Internet protocol (IP), no uniform standard has been established as yet. There are certain "favorites" for certain areas of application (for example, H323 for video conferencing or similar).

WO 03/046861 A1 discloses an electronic teaching system, whereas the communication between teacher and students takes place via a LAN, which is connected to a central DVB (digital video broadcasting)-receiver station with DVB-tuner/receiver, central control unit and mass storage unit. The DVB-tuner/receiver may be designed as a set-top box, which receives the DVB information and forwards this information by means of a control unit in the form of a PC (personal computer) via the LAN to the computer of the teacher. The central DVB-receiver station, with appropriate authorization, can also access certain services from the DVB-service provider via a downward channel of the telecommunication network.

Furthermore, WO 03/026248 A1 discloses an electronic teaching system, whereas the communication between student and teacher is managed via subscriber lines by a central control device (there referred to as OLMS, Open Learning Management System). A database with a control device (there referred to as LMS, Learning Management System) is connected to the central control device, which prevents unauthorized access to programs and data and corresponding to learning progress controls access to teaching contents.

Similar designs of an electronic teaching system with access corresponding to learning progress and communication via Internet are known from WO 02/37697 A2 or from WO 02/075694 A1.

Finally, WO 02/097654 A1 discloses an electronic teaching system, whereas the profile of a student is centrally stored, whereas the profile, aside from learning progress, also includes information on the technical equipment of the student including bandwidth limitations of the subscriber line. This bandwidth limitation can be specified by the student or by the system administrator for a group of students.

The situation described here has resulted in the fact that e-learning and tele-teaching, in spite of the sensible approach of making the didactic skills and knowledge of lecturers available to a wider audience outside the classrooms and lecture halls, as well as also making elaborately prepared instructions materials available to a larger group of users, has not been able to gain acceptance on a broader base.

Previously available, predominantly exclusively software-based solutions, required a relatively high level of homogeneity with regard to technical equipment and bandwidth available to subscribers and, in addition, assumed that the corresponding software could be installed for this purpose on the equipment used by the persons participating in tele-teaching or e-learning events.

Due to the above-mentioned time-limitations of these events, but also, in part, due to organizational problems (changes in the EDP-structure within an organization), these requirements for homogeneity could only be fulfilled with difficulty or not at all. In this respect, it is exactly the possibility of being able to attend a time-limited dedicated teaching event where the actual benefit of e-learning and tele-teaching lies, in contrast to the necessity of being present during certain time periods.

The above discussion of prior art acknowledges differently designed methods and devices for the implementation of tele-teaching or e-learning events are known. For this purpose, computer networks or network connectivity usually requires special hardware and software components with a number of expensive devices specially designed for communications, such as communication servers for the connection to another network (public data network, another LAN or host system), or a file server, which administrates data and makes these available to users in the network, as well as corresponding network access protocols, for example, CSMA/CD (Carrier Sense Multiple Access/Collision Detection), Token-Passing (bit pattern as authorization mark) or TCP/IP (Transmission Control Protocol/Internet Protocol). However, little attention was paid to the user group of students and their existing equipment. That is why there is a lack of practical, cost effective e-Learning and tele-teaching systems, which would assure individual, in particular automatically adaptable, interactive communications. This is of particular significance, because the telecommunications and computer industry must be viewed as extremely progressive and development-friendly industries, which quickly take up improvements and simplifications and put them into realization.

The aim of the invention is to improve the generic methods/devices in such a manner that workstations that can be freely interlinked and that allow for individual interactive communication can be set up at low costs.

SUMMARY OF THE INVENTION

This object is achieved by a method for the establishment of a virtual electronic teaching system with the use of a telecommunication network with a main distributing frame connected to an exchange, in which an access multiplexer and/or splitter are connecter or integrated in the main distribution, with analog or digital telecommunication devices and with an interface circuit connectable to one of these devices, which on the one hand, is connected via a subscribe line circuit or a subscriber modem and splitter or a network termination and subscriber lines to the main distribution and, on the other hand, to the workstation of the person participating in the e-Learning or tele-teaching event the inventive method comprising the following steps:

when the connection is set up, at the transmitter end, the kind of connection available at the interface circuit is determined;

a stored test information is transmitted to the remote station; and a receipt received from the remote station in the return direction is evaluated;

whereby the bandwidth available on the telecommunication system is tested.

Testing of the bandwidth available at a telecommunication device as such is well known. For example, a facsimile device is known from DE 197 13 946 A1, which is able to increase the efficiency and reliability of communications by determining, based on a retransmission condition or conditions which are known through a transmission station or receiving station, whether or not the transmission rate must be reduced and a retransmission is continued. Moreover, the facsimile device is able to reduce the transmission rate appropriately in order to reduce errors and improve the efficiency and reliability of communications. For this purpose, the facsimile device is equipped with a modem, which is able to determine the transfer rate for image data communication in compliance with the transmission quality of a communication circuit or line. Further to that, the facsimile device uses a protocol that enables the transmitter side or the receiver side to perform a decrease procedure to reduce the transfer rate at the start of a control channel used to enable the transmitter side and the receiver side to exchange control signals. The control signals comprise an error frame retransmission function and follow a primary channel that is allocated to a data communication. Specifically, the facsimile device is equipped with a transfer rate detection function in order to detect the transfer rate at the time of the retransmission of an error frame, a counter function for counting the number of retransmission processes taking place at the same transfer rate, a determination function in order to determine whether or not the retransmission processes which took place at the same transfer rate have been repeated at a frequency corresponding to a pre-selectable number, and a control function to execute the decrease process, if the retransmission processes at the same transfer rate has been repeated corresponding to the pre-selectable number of times. Moreover, a frame quantity detection function is planned, in order to detect the number of frames every time error frames are retransmitted. Based on a G3 standard transmission control process, the facsimile device is equipped with a switching condition monitoring function, in order to monitor a switching condition or a line condition during an acknowledgment or during the reception of image data, as well as a date change request function. In this way, the receiving side can be prompted to transmit a signal following or during the reception of a page of image data, which serves the purpose of requesting a decrease or increase of the transmission rate on the basis of switching conditions or line conditions, which are being monitored by the switching condition monitoring function. Specifically, the switching condition monitoring function monitors the switching condition or line condition in terms of the EQM-value, and the rate change request function request a rate decrease when the EQM-value increases, and requests a rate increase when the EQM-value decreases. Finally, the facsimile device features a table, which lists the EQM-values and transmission rates in a ratio of one-to-one.

Furthermore, DE 101 13 196 A1 discloses a method and device for transfer rate collection for serial multiple speed imbedding clock pulse receivers. In order to collect two or more different transfer rates in stable fashion simply and automatically, the first process initially uses a statistical check of signal edge placement and timer characteristics of the incoming data flow, followed by the identification of a signature, which is allocated to the signal edge characteristics, on the basis of signal edge characteristics, and finally, a determination of the transfer rate with which the data flow is transmitted, on the basis of the identified signature. An alternative inventive method comprises the following steps:
supply of a clock pulse signals with an initial transfer rate, in which the clock pulse signal has clock pulse edges;
locking of clock pulse edges with data transition of an incoming data flow;
differentiation between data transitions occurring with even and uneven clock pulse edges;
determining whether or not data transitions on average occur either with even or uneven clock pulse edges, or whether data transitions on average occur with even as well as uneven clock pulse edges; and
determining the transfer rate of incoming data on the basis of where data transitions are occurring.

The system comprises a new phase comparator, which is configured to receive a data flow transmitted at high speed and emits a message each time the data flow contains a data transition. A voltage-controlled oscillator is connected to the phase comparator and supplies a clock pulse signal with clock pulse edges. The clock pulse signal is locked to the data flow. A transfer rate recording circuit is connected to the phase comparator and receives a series of pulses, which are emitted by the phase comparator. The data recording circuit determines the transfer rate on the basis of received pulses. Specifically, the data recording circuit comprises an edge ration detection circuit and a threshold circuit, in order to determine the transfer rate on the basis of the transition density of the data flow over a given period of time.

Furthermore, DE 199 59 179 A1 discloses a method for the dynamic change of transfer rate adaptation factors in a radio communication system. To improve the accuracy of transfer rate adaptation factors, one or more of the transfer rate adaptation factors are determined service-specific, the data to be transmitted are processed according to the determined transfer rate adaptation factor and entered in a transmission frame, and during the transmission the transfer rate adaptation factors are continually determined and updated. In this process, the adaptation takes place by means of an additional control loop by way of dynamic variation of the transfer rate adaptation factors. For this purpose, a transport channel transmitting a bit and/or block error rate is checked by the receiving or transmitting radio station and, in case of excessive deviation from a target value, a correction of the respective transfer rate adaptation factor is initiated.

Finally, DE 296 23 893 U1 discloses an initialization protocol for adaptive transfer rates and the associated transceiver, in particular for communications between two Asymmetric Digital Subscriber Line (ADSL) modems. To support the adaptation of transfer rates without a restart, i.e. without renewed execution of all previously executed identification and initialization steps, the initialization protocol contains a first phase (PROPOSAL), in which a first transceiver proposes a limited range of transfer rate values for the said transfer rate, a second phase (CHANNEL ANALYSIS), executed between the first phase (PROPOSAL) and a third phase (SELECTION), in which the highest transfer rate for the transmission via a communication connection to a second transceiver is measured, and in which is indicated which one of the transfer rate values has been selected for the transfer rate, and a fourth phase (CONFIRMATION), in which is confirmed that the selected transfer rate value for the transfer rate is used for future transmissions. Prior to execution of the fourth phase, the first transceiver or the second transceiver may announce a new proposal for the transfer rate, whereupon the first phase is executed again. For this purpose, an announcement of a new proposal for the transfer rate is based on the results of the second phase. If none of the initially proposed transfer rate values comes close to the highest supported transfer rate from below, a transceiver may inform the other transceiver of its request to formulate a new proposal. This new proposal may contain the highest supported transfer rate and some lower values for the transfer rate, which are also acceptable to the transceiver that generates the new proposal for the transfer rate. In this way, a renewed execution of the first, second and third phase may in the end result in a selected transfer rate that is correctly adapted to the capacity of the connection line. This transfer rate is confirmed in the fourth phase. Thus, should one of the transceivers for whatever reason not be satisfied with the transfer rate values from the first proposal, it may announce a new proposal, even though it does not yet know the capacity of the connection.

The method of the present invention has the advantage that a uniform connection for the purpose of testing the connection line, in particular for the determination of available bandwidth, is provided. Due to the fact that the test is performed automatically, the teacher and the students are relieved from testing the available bandwidth during start-up or operation. The test does not even have to be performed on-site, but can be implemented anywhere within the system from any location.

Furthermore, this object is achieved by an inventive virtual electronic teaching system using a telecommunication network, which comprises a main distribution connected to an exchange, with an access multiplexer connected to or integrated in the main distribution and/or a splitter, and analog or digital telecommunication equipment by:
an interface circuit connectable to the telecommunication device, which, on one end, is connected via a subscriber line or subscriber modem and splitter or a network termination and subscriber lines to the main distribution and, on the other end, to a workstation of the person participating in the e-Learning or tele-teaching event, and which tests the bandwidth available at the telecommunication device.

In comparison to state-of-the-art electronic teaching systems, the teaching system of the present invention offers the advantage that an expensive preliminary installation is not required, that the interface circuit enables a simple expansion or modification of the teaching system, including the establishment of new user groups and a significant expansion of the area of application and that, in particular, the connection of a new student to the teaching system can be accomplished immediately and even by an untrained user. The interface circuit of the present invention offers the advantage of enabling, in a surprisingly simple fashion, an individual conception of the virtual electronic teaching system by the user. In comparison to state-of-the-art systems, the user himself "designs" the virtual electronic teaching system in accordance with his requirements by means of menu-driven programs, so that the software functions are not limited and the manufacturer of the interface circuit of the present invention does not have to—in consideration of a in interface circuit that can be used as soon as possible for any purpose—make a selection between associated functions.

Furthermore, it is advantageous in that a decentralized control of a testing process running on the workstation is made possible. It is also possible, from any point of the telecommunication network, to perform the tests by means of PC/web server or mobile measuring point (GSM or, in case of higher bandwidths, UMTS), where the network connection may also be accomplished via an IP interface (including packet-switched network). If applicable, data serving the purpose of testing and maintenance of a workstation may also be changed in this way. If the commands are transmitted from a central workstation (teacher), a particularly powerful method for the introduction of new functions or modification of existing functions is available, since the changes need only be made at the central workstation rather than at all individual workstations. Moreover, the results are available to teaching personnel immediately after completion of the test. Based on this, further decisions can be taken quickly, or further connections can be communicated.

In a further development of the invention, an access authorization is stored in the interface circuit, by means of which the control of establishing a connection and the test process is safeguarded against unauthorized access and the procedure is recorded.

This further development of the invention is advantageous in that the test or maintenance can only be performed by personnel appointed to the task. It is also possible to assure access to certain groups of processes by means of various access codes, in order to limit responsibilities or distribute responsibilities differently within personnel. For example, it is possible to form CUG (closed user groups) via ISDN, so that the previously used method of return call numbers may be omitted and, for example, a dislocation of the interface circuit does not result in a software change.

Further advantages and details are contained in the following description of a preferred embodiment of the invention with reference to the drawing.

DESCRIPTION OF THE PREFERRED EMBODIMENT

Figure 1:
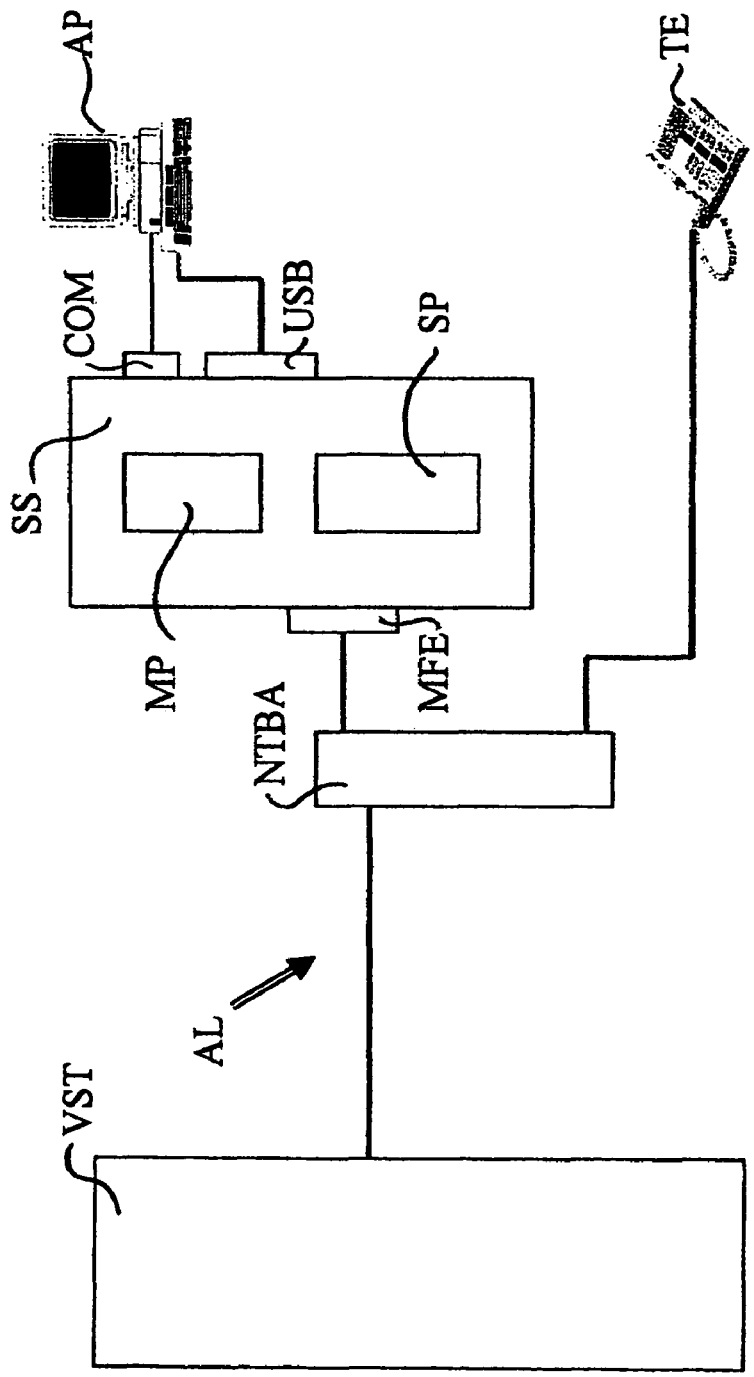
FIG. 1 shows a block diagram of a first embodiment.

The first inventive embodiment shown in FIG. 1, the interface circuit SS is represented as an autonomous device, which is equipped with its own microprocessor MP, its own EPROM memory SP and, if applicable, its own hard disk (not shown), as well as corresponding interfaces COM (Component Object Model: Windows based technology providing interfaces and enabling communication between software components), USB (Universal Serial Bus: serial interface), allowing connection of up to 127 peripheral devices (mouse, keyboard, printer, scanner, digital cameras, modems, CD-ROM/DVD drives, telephones, MP3 player, etc.; USB 2.0 allows data transfer rates of up to 480 Mbps and therefore is also suitable for the transmission of video data and for fast hard disks).

The device SS communicates, on the one hand, via a standardized interface COM, USB with a microcomputer at workstation AP of the person participating in the e-Learning or tele-teaching event (USB, COM1 or similar), and on the other hand, with the telecommunication device TE this person has available.

For this purpose, the device SS first performs a test to verify the bandwidth available at the telecommunication device TE.

The log-in procedure is stored in the memory unit SP of the device SS, which is used by this device SS to establish a connection to the central content server of the tele-teaching event, utilizing a telecommunication network with a main distribution connected to an exchange, where an access multiplexer and/or splitter is connected to or integrated in the main distribution.

Once the connection has been established, the first step is to determine the type of connection pending at the communication interface (analog or digital) and then to determine the available bandwidth by transmitting a sequence of test signals (which are also stored in the memory unit SP of this device SS). The telecommunication device TE may be connected to the main distribution via a subscriber line or subscriber modem and splitter or via a network termination NTBA and the subscriber line AL.

A particularly inventive embodiment is that most common transmission protocols, which are based on the IP protocol, are stored in the memory unit SP of the device SS.

The device SS independently tests the available protocols in communication with the content server of the tele-teaching event and sets itself up for the protocol offered by the content server.

Another important function of the device consists of the way it prevents typical "time out"-problems by indicating the complete reception of an image file in such a way, that the workstation AP remains connected to the tele-teaching or e-learning event, even though, for example, the transmission of high-resolution images with a frame rate of 16 1/sec. is not possible with a 56 KBit connection.

This feature assures that, as far as the transmitting side is concerned, the participant is still connected, however, the participant will only be able to receive and display the audio portion of the information and possibly part of the image.

For many events, this is not necessarily a disadvantage, because it is possible, for example, to transmit information to the workstation ahead of time, which can then be used independently (for example, video information will be available) and to have the "live communication" only within the scope of the actual e-learning or tele-teaching event.

Since e-learning and tele-teaching organizers are planning to make the device SS available to participants on a loan basis for the duration of an event or a booked and paid training course, it is also important that the device SS is additionally equipped with an electronic signature (access authorization) stored on the memory medium SP. Only those devices SS which are approved for the event will be able to independently establish a connection in the above described way.

Correspondingly, the memory media in question (as a rule, EPROMs) should be exchangeable.

Figure 2:
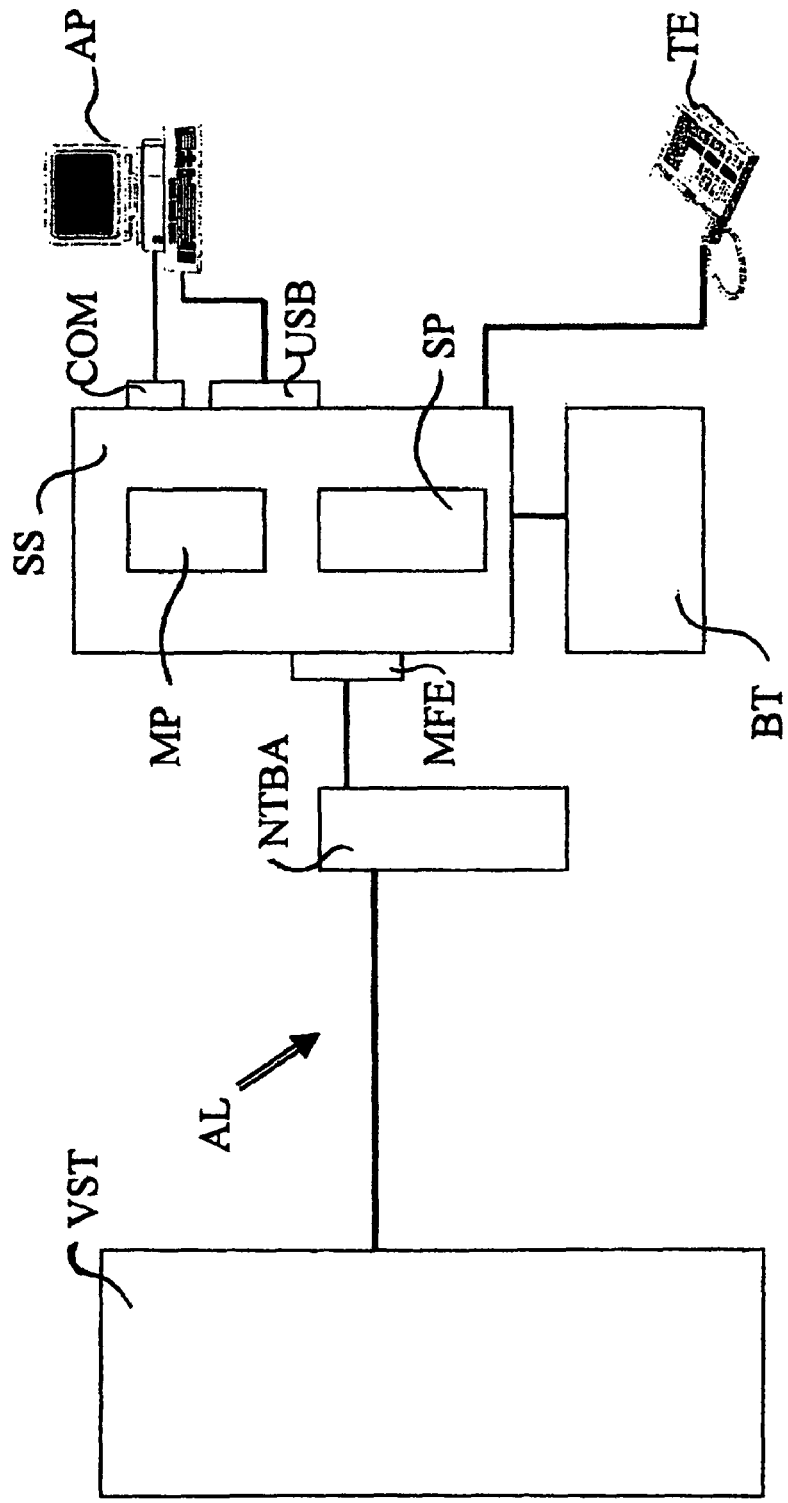
FIG. 2 shows a block diagram of a second embodiment of the teaching system in accordance with the invention.

FIG. 2 shows another inventive embodiment in that the device SS is located between the microcomputer of the participant at workstation AP and the telecommunication device TE as described above, but also between the power supply of the participant's microcomputer and a locally existing PC network. This makes sense, particularly in cases where, within the scope of a local event (for example, internal training) it is intended to exercise complete remote control of the participant's computer, including taking control of the keyboard, the mouse, as well as corresponding transmission of screen contents from teacher to student, back to the teacher and to other participants within a LAN. For this purpose, the device SS must be equipped with the appropriate interfaces (for keyboard, mouse, power supply and graphic adapter, video-/graphic adapter).

Another inventive embodiment consists of providing the device SS, according to FIG. 1 or FIG. 2, with an additional intelligent operating element BT for language training. The operating element BT is designed to interpret, for example, voice files which are stored on the participant's computer or which are transmitted as a stream within the scope of e-Learning or tele-teaching event, as a so-called "teacher track" (which cannot be altered by the student) and further to that, to record exercises by the student, for example, repeating a sample text, on the "student track". Recordings are stored in both cases on the memory media of the participant's computers, and are replayed using the computer's sound equipment. In this case, this voice lab operating element BT is connected to the appropriate communication head set (microphone, ear phones), while these inventive embodiment according to FIG. 1 and FIG. 2 are directly connected to the device SS.

The system may be further enhanced by connecting a so-called webcam to the workstation AP, allowing the participant to present himself in his contributions to the discussion, or present an experimental setup prepared by him to the other participants or to an auditorium, if there is a combination of the presence phase and e-learning and tele-teaching participants.

Another inventive embodiment may be that the signature stored in the device SS makes it possible to transfer so-called content, which have been stored by the organizer of the e-learning and tele-teaching event on his content server, permanently to the computer of the participant (file or stream transfer for storage on the computer of the participant) making the content available not just temporary within the scope of the event, i.e. to be visualized and audible only by means of the corresponding interface of the device without transmission to the computer of the participant.

According to another inventive embodiment, the interface circuit SS is designed as a plug-in card for a network station (subscriber equipment TE) or a PC (workstation AP). The plug-in card, in turn, is equipped with a least one microprocessor MP and a bus interface in form of a LAN interface, where the LAN interface is connected to the network station or the PC acting as host system via the PCI bus which transmits the protocol control information. When the card is plugged into the host system, it is detected by the plug-and-play function or by standard drivers as a LAN card. This automatically accomplishes a "login to the network" or start-up, and even in case of exchange of the interface circuit SS of the present invention, "re-programming" is not required. For example, with the software module ICL (Intelligent Connection Layer) there is the possibility of switching between various public network connections (ISDN, X.25, dedicated lines, dial-up connections such as FE dialing, C and D networks) as required. Thanks to this modular technology, future developments in network technology, for example, GSM, can be integrated seamlessly.

Moreover, through use of the components USV, power supply, hard disk (alternatively flash ROM), cooling fan and housing of the host system, cost savings and expanded functions are possible. The plug-in card uses the PCI bus only for power supply and as a LAN interface. Should the host system fail, the interface circuit of the present invention is still operable, since it continues to receive data through the LAN and power can still be drawn from the PCI bus after a failure of the host system. This connectivity enables in beneficial fashion the use of the interface circuit SS in any system with a PCI bus (Sun Ultra, Unix) and, in addition, enhances the operational reliability of the network.

Preferably, the plug-in card is equipped with a call number memory for access by authorized users and/or network participants and, depending on the transmitted call number, the call number is verified and/or the connection to the authorized caller is established. A breach from public networks can be prevented, for example, by means of ISDN call number verification. The call number, tamper-free transmitted through the D-channel, is compared to a table with call numbers of authorized users. In case of activated callback function, the interface circuit SS establishes a connection to the authorized caller. Further security measures may be: IP packet filter, callback, identification control, PAP (password authentification protocol), CHAP (challenge authentification protocol) and encryption. Of all the above methods, the last-named encryption is still the most effective means in data protection for the purpose of rendering data useless when in the wrong hands: for example, the interface circuit SS can be supplied with an encryption method according to the DES standard.

Fees for dial-up connections are charged according to a time and distance related pattern. In order to avoid idle times, the interface circuit SS automatically breaks the connection in case of inactivity in data communications greater than a preselected waiting time (short hold) and, once data are pending again, restores the connection. With optional compression, the data traffic can be reduced.

Finally, the interface circuit SS is able, depending on the bandwidth requirements, to automatically switch additional communication channels, by means of which a dynamic channel management and bandwidth control, is achieved. Depending on the demand of bandwidth, i.e. depending on the volume of data to be transported, the interface circuit SS automatically activates additional communication channels. For example, by parallel operation of all 30 B-channels it is possible to achieve transfer speeds up to 1.92 Mbit/sec.

Figure 3:
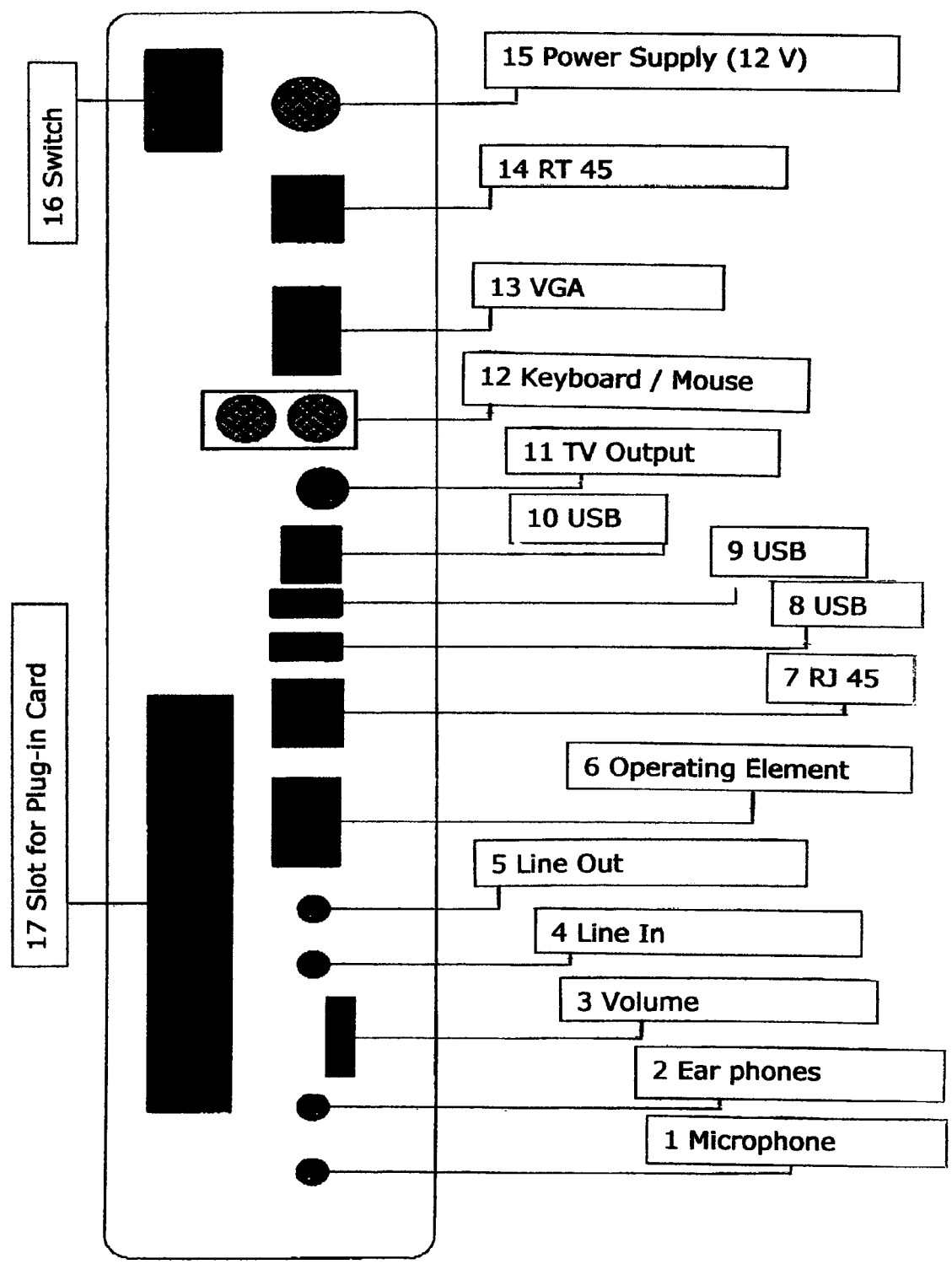
FIG. 3 shows an inventive embodiment of the interface circuit SS, viewed from the connection side.

The hardware concept of the interface circuit SS can be adapted to the varied established connectivity standards in worldwide network operations. FIG. 3 shows an inventive embodiment of the interface circuit SS viewed from the connection side. The connectors are numbered as follows: 1: Microphone, 2: Headset, 3: Volume control, 4: Line in, 5: Line out, 6: Connector for operating element, 7: Webcam, 8, 9, 10: USB connectors (e.g. LAN/TP), 11: TV set, 12: Keyboard, mouse, 13: VGA monitor, 14: TAE/ISDN/DSL connector, 15: Plug-in power unit (12 V), 16: On/Off switch and 17: Card slot for plug-in card (PCMCIA). Specially adapted LAN modules with a choice of BNC, AUI, LWL or twisted pair connectors connect the interface circuit SS to local token ring and Ethernet networks. Access to long distance networks (e.g. ISDN, X.25) and dedicated lines is provided with, in part, multi-channel WAN adapters ($S_O$, $U_{PO}$, $U_{KO}$, X.21, V.24, V.35). Active WAN adapters can be used for optimum performance. In the area of ISDN, the protocols DSS1, 1TR6, NI-1 as well as Fetex 150 are available.

The inventive method, in connection with the interface circuit SS (and its multimedia front end MFE), enables the cost effective establishment of randomly networked workstations with individual, interactive communication via random, wireless or wired networks or telecommunication networks (for example, UTRAN UMTS Terrestrial Radio Access Network); this means that the workstations can be freely interlinked and individual interactive communication can be set up at low cost. The iterative process running for this purpose with regard to bandwidth includes all reasonably occurring bit rates, which are stored correspondingly, can be used, in particular, in heterogeneous structures and also allows network monitoring with inclusion of the workstation AP and the telecommunication devices TE.

In this way, it is possible for the first time to continue work started in class at school, at the university or college at home—that is, to practice "blended learning", linking the presence in the classroom with "self-teaching phases" and, by means of "plug and play" to join heterogeneous user groups with regard to previous professional training, frequently also concerning EDP skills and with regard to available computer and communication equipment, respectively having the users themselves set up their own video conferencing or eLearning environment. Moreover, it is advantageous that the interface circuit SS (Syncobox) of the present invention is designed as an autonomous unit (with a connector for a plug-in power supply) and is suitable for analog, ISDN and DSL connections, that e-learning and video conferencing (connectors: web cam, headset and, if applicable, operating element) is enabled with a TV set and without a PC, the corporate LANs remain unchanged (security), that the interface circuit SS reliably protects eLearning sessions and content against unauthorized use and that "crashes" due to incompatibilities between existing computer installations and added video conferencing and eLearning software (not every problem occurs immediately) or "time-outs" during the session are reliably prevented.

In a further development of the invention it is possible, for example, to start up or remotely start up the operating system of the microprocessor MP of the interface circuit SS either via a boot prom or via the integrated LAN interface from the hard disk of the host system or via the external LAN interface from a random system in the LAN, so that, after the booting procedure, the interface circuit SS represents an autonomous, communication platform independent of the used operation system (for example, WinNT); for TCP/IP and SPX/IPX it is possible to install or integrate routing functions (also as LCR: Least Cost Router), etc.

I claim:

1. A method for establishing a connection between a virtual electronic teaching system having a central content-server for an e-learning or tele-teaching event and a workstation of a person participating in the e-learning or tele-teaching event utilizing a telecommunication network having a main distribution connected to an exchange with an access multiplexer and a splitter or a splitter connected to or integrated in the main distribution and an analog or digital telecommunication device, the method comprising:

connecting an interface circuit to the telecommunication device or to the workstation, the interface circuit including a memory unit and a microprocessor;

registering the interface circuit to the content-server by means of a log-in procedure stored in the memory unit, the interface circuit registering vicariously for the telecommunications device;

establishing a connection between the interface circuit and the content-server vicarious for the telecommunication device connected to said main distribution via a subscriber line or subscriber modem and splitter or a network termination and subscriber lines;

determining a type of connection pending on the communications interface of the interface circuit;

transmitting at least one stored test signal from the memory unit of the interface circuit to the content-server;

evaluating an acknowledgement received by the interface circuit from the content-server in response to the test signal;

testing at least a bandwidth available to the telecommunication device using the interface circuit, testing all available protocols in communication with said content-server using the interface circuit as the content-server adjusts itself, adjusting the interface circuit to a protocol proposed by the content-server, and preventing "time out"-problems by emitting a message from the interface circuit confirming the complete reception of an image file from the content-server such that said workstation remains connected to said e-learning or tele-teaching event including during periods when broadband transmission is not possible.

2. The method of claim 1, wherein said interface circuit a plug-in card for the telecommunication device or the workstation, and wherein depending on the bandwidth demand said plug-in card automatically activates additional communication channels by means of which a dynamic channel management and bandwidth control is achieved.

3. The method of claim 1, further comprising:

storing an access authorization in said memory unit of the interface circuit to secure establishment of the connection and to prevent unauthorized access, and recording the log-in procedure.

4. A virtual electronic teaching system, comprising:

a central content-server for an e-learning or tele-teaching event;

a workstation of a person participating in the e-learning or tele-teaching event;

a telecommunication network connected to said content-server, the telecommunication network including a main distribution connected to an exchange and an access multiplexer and a splitter or a splitter connected to or integrated in the main distribution;

an analog or digital telecommunication device; and an interface circuit connected to the telecommunication device, the interface circuit having a memory unit and a microprocessor, wherein a first end of said interface circuit is connected to the main distribution via a subscriber circuit or a subscriber modem and a splitter or a network termination or subscriber lines and a second end of said interface circuit is connected to said workstation, and wherein the interface circuit is connected via at least a standardized interface vicarious for said telecommunication device and registers itself to said content-server by means of a log-in procedure stored in the memory unit, and automatically tests at least a bandwidth available to the telecommunication device and all available protocols in communication with said content-server as a remote station and adjusts itself to a protocol proposed by said remote station by transmitting at least one test signal stored in the memory unit to said content-server so that said interface circuit prevents "time out"-problems by indicating the complete reception of an image file such that said workstation remains connected to said e-learning or tele-teaching event including during periods when broadband transmission is not possible.

5. The virtual electronic teaching system of claim 4, wherein the interface circuit further comprises a hard disk and at least one of each a plurality of different conventional plug-type connectors for connecting the telecommunication device to the workstation.

6. The virtual electronic teaching system of claim 5, wherein the memory unit is an exchangeable read-only memory media.

7. The virtual electronic teaching system of claim 4, wherein an intelligent operating element is connected to the interface circuit.

8. The virtual electronic teaching system of claim 4, wherein the interface circuit is a plug-in card for a network station or a PC.

9. The virtual electronic teaching system of claim 8, wherein the plug-in card comprises at least one microprocessor and a LAN interface, wherein the LAN interface is connected to a PCI bus transmitting control information, and wherein a network station or a PC constitutes a host system.

10. The virtual electronic teaching system of claim 9, wherein said plug-in card is detected as a LAN card by a plug and play function or by standard drivers when said plug in card is plugged into said host system.

11. The virtual electronic teaching system of claim 8, wherein said plug-in card comprises a call number memory with a number of participants or network stations authorized to access data, and wherein, depending on a transmitted call number, the call number is verified or the connection is established to the authorized caller.

12. The virtual electronic teaching system of claim 8, wherein the plug-in card automatically breaks a connection in case of a pause in transmission lasting longer than a preselected waiting time, and restores the connection when data are once again pending.

13. The virtual electronic teaching system of claim 8, wherein, depending on a bandwidth demand, the plug-in card automatically activates additional communication channels to achieve dynamic channel management and bandwidth control.

* * * * *

UNITED STATES PATENT AND TRADEMARK OFFICE
CERTIFICATE OF CORRECTION

| | | |
|---|---|---|
| PATENT NO. | : 7,840,649 B2 | Page 1 of 1 |
| APPLICATION NO. | : 10/568973 | |
| DATED | : November 23, 2010 | |
| INVENTOR(S) | : Pabst | |

It is certified that error appears in the above-identified patent and that said Letters Patent is hereby corrected as shown below:

In Column 12, Line 30 (Claim 2, Line 1), after "circuit", insert --is--.

Signed and Sealed this
Eighth Day of February, 2011

David J. Kappos
*Director of the United States Patent and Trademark Office*